Oct. 28, 1947.  V. A. RAYBURN ET AL  2,429,944
METHOD OF AND APPARATUS FOR SHEARING ARTICLES
Filed Aug. 14, 1945  5 Sheets-Sheet 1

FIG. I

INVENTORS
V.A. RAYBURN
D.C. ROBSON
BY
ATTORNEY

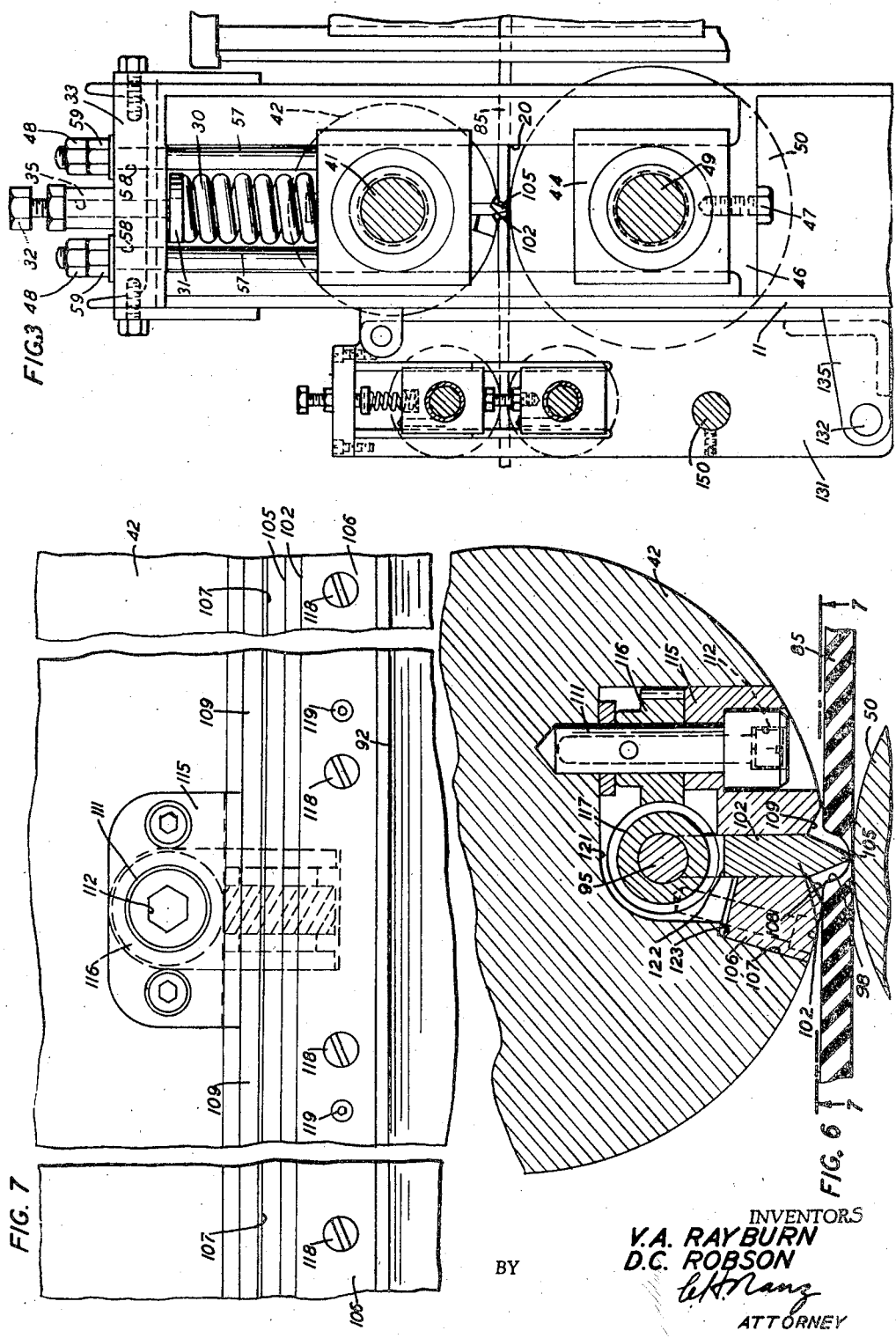

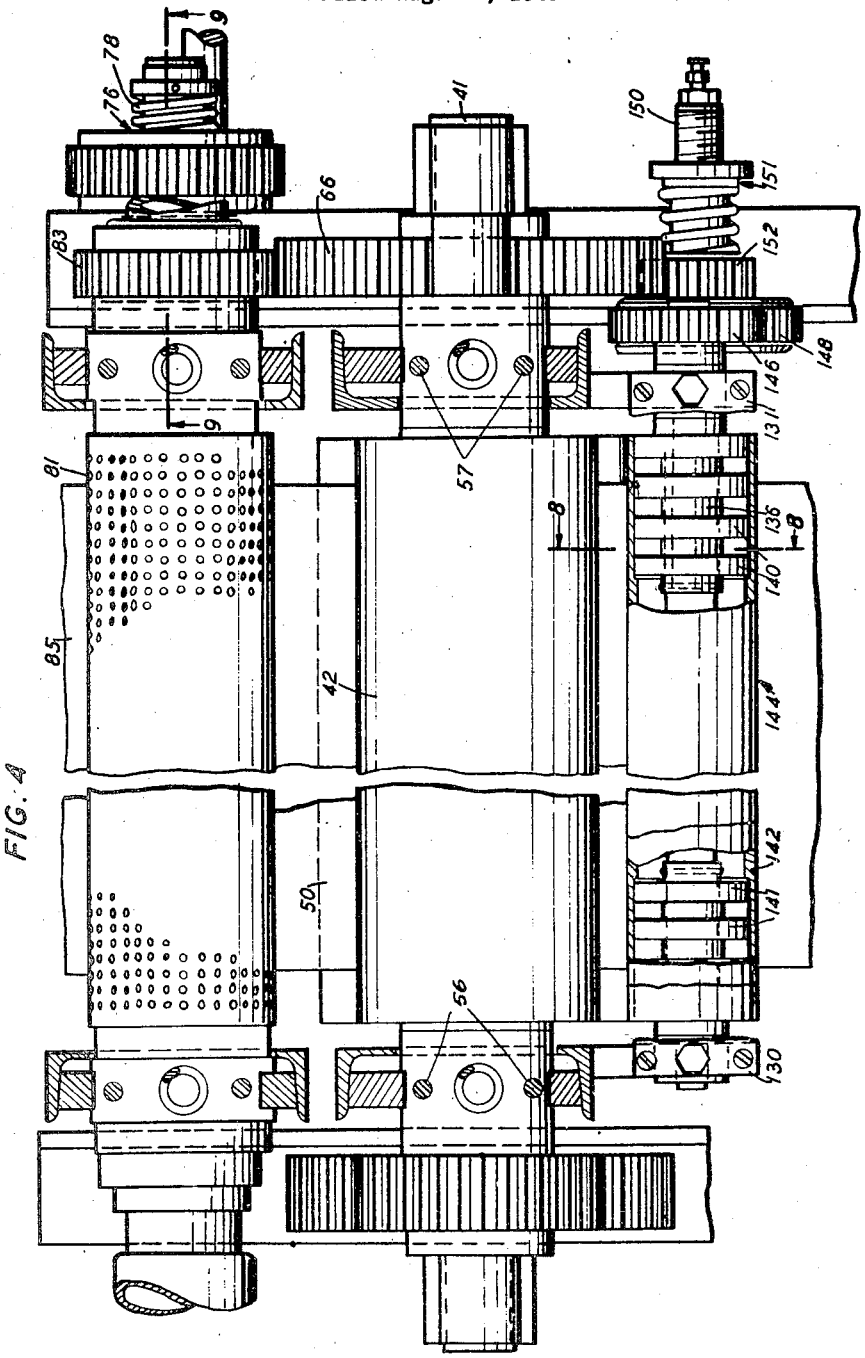

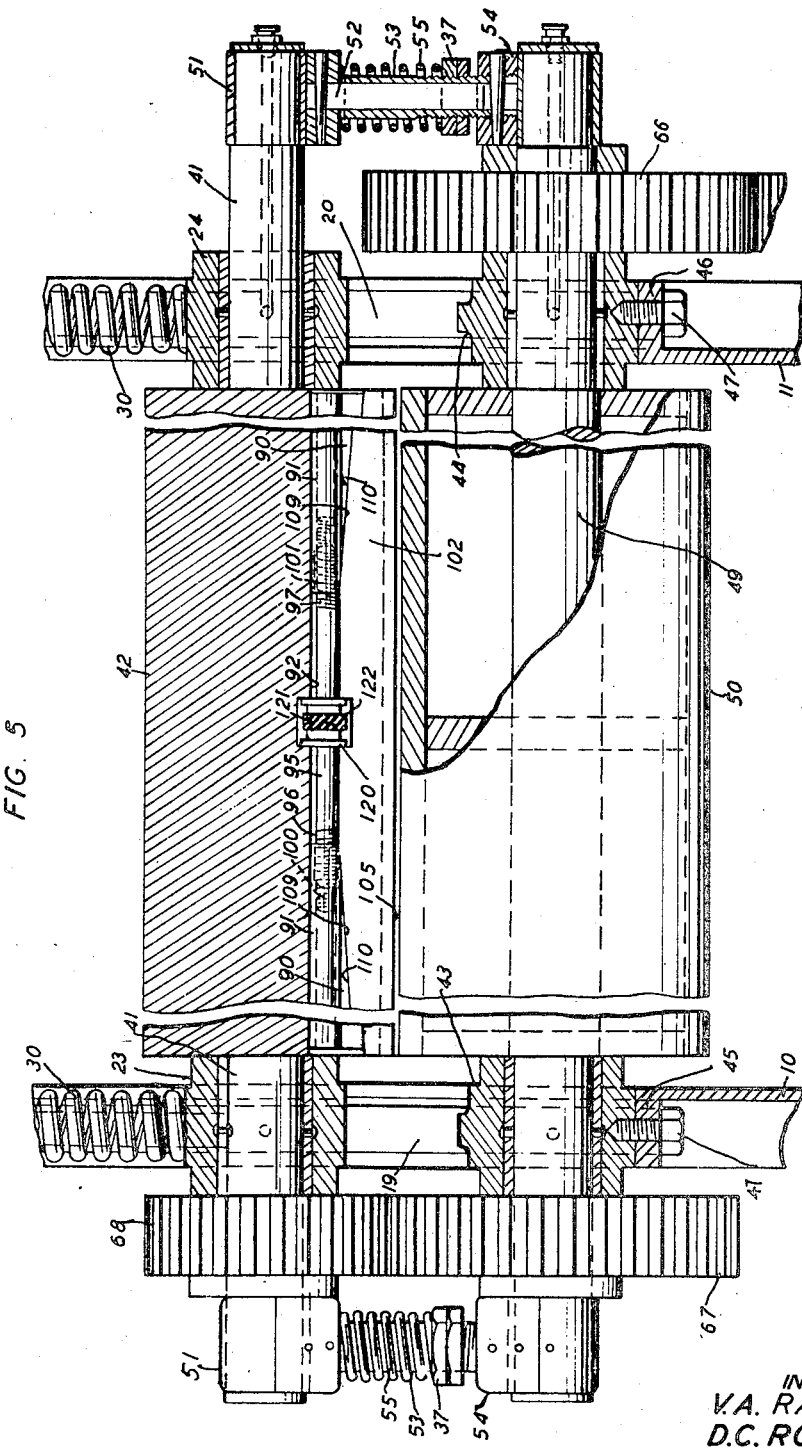

Oct. 28, 1947.   V. A. RAYBURN ET AL   2,429,944
METHOD OF AND APPARATUS FOR SHEARING ARTICLES
Filed Aug. 14, 1945   5 Sheets-Sheet 5
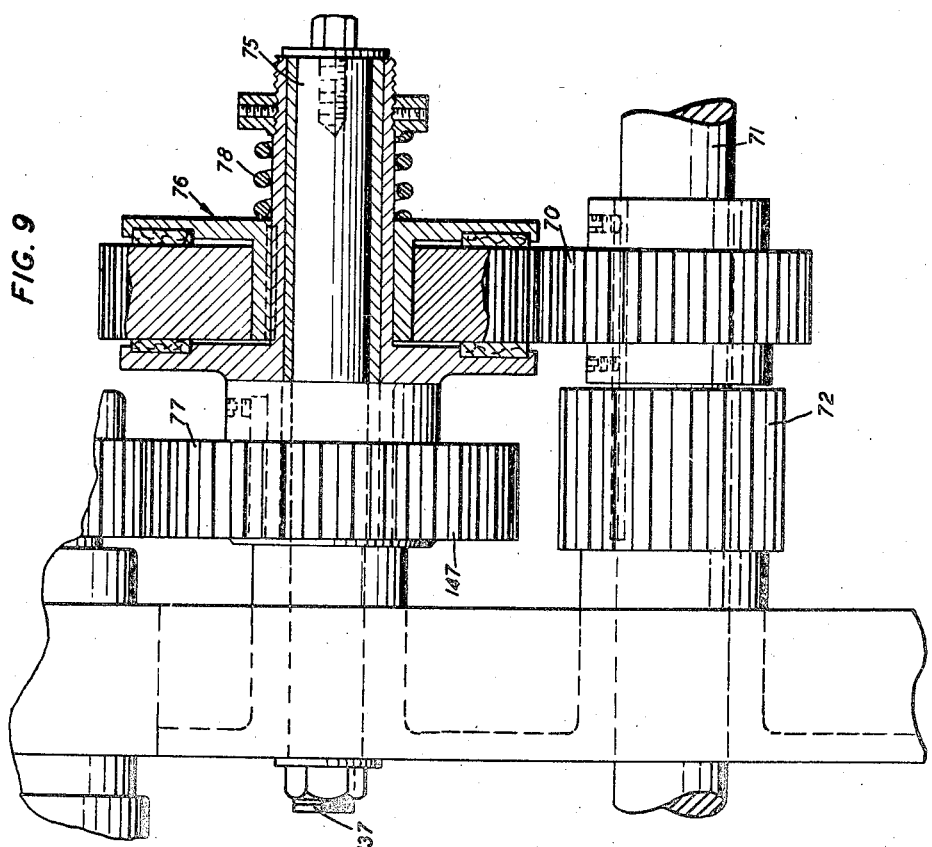
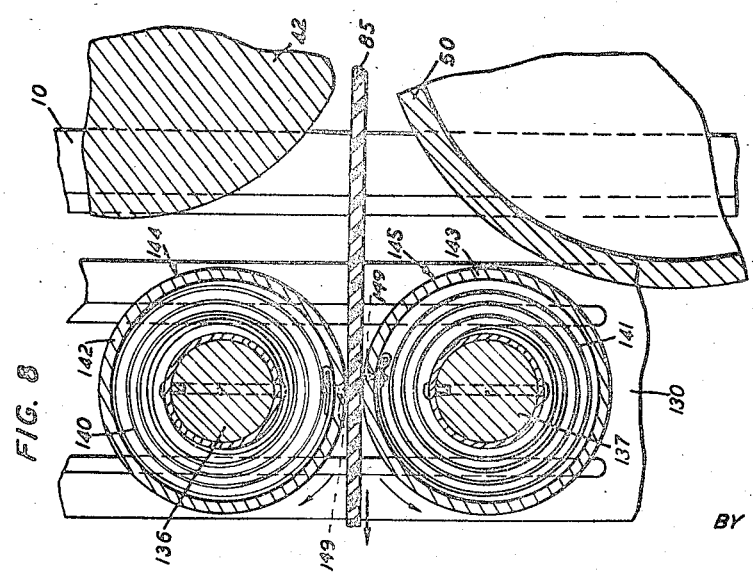
INVENTORS
V. A. RAYBURN
D.C. ROBSON
BY
ATTORNEY Patented Oct. 28, 1947

2,429,944

UNITED STATES PATENT OFFICE 2,429,944

METHOD OF AND APPARATUS FOR SHEARING ARTICLES

Vincent A. Rayburn and Duer C. Robson, Baltimore, Md., assignors to Western Electric Company, Incorporated, New York, N. Y., a corporation of New York Application August 14, 1945, Serial No. 610,832

17 Claims. (Cl. 164—68)

1

This invention relates to methods of and apparatus for shearing articles, and more particularly to methods of and apparatus for shearing strips of material into a multiplicity of slabs.

In processing rubber or rubber-like materials for use in some manufacturing operations, the material is rolled into strips and the strips are cut into slabs. Apparatus hitherto known for shearing such strips into slabs has been of a reciprocatory type, including flying shears and stationary or non-flying shears. Such shearing apparatus do not convey the strips throughout the operations thereof and tackiness of the strips cause them to stick to the apparatus and buckle, so that slabs of uniform lengths cannot be cut thereby. Also, the apparatus of the prior art require sharp-edged cutting elements to operate and the sharp-edged cutting elements must be sharpened frequently to maintain the apparatus in operative condition.

An object of the invention is to provide new and improved methods of and apparatus for severing articles.

In practicing the invention, a strip of plastic material is advanced toward a pair of inrunning shear rolls at a predetermined rate of speed by a pair of inrunning feed rolls. The shear rolls, which include an anvil roll and a blade roll, are driven at rates of speed at which the strip is tensioned between the feed rolls and the shear rolls, and as a blunt-edged blade carried by the blade roll is rotated to a position normal to the anvil roll, the strip is compressed to a membrane between the blunt-edged blade and the anvil roll. The blade is moved at a greater rate of speed than that of the periphery of the anvil roll so that the membrane is rubbed between the edge of the blade and the anvil roll while it is pinched to a membrane. The tension imparted to the portion of the strip between the feed rolls and the shear rolls and to the membrane, the pressure applied to the membrane by the blade and the anvil roll and the rubbing of the membrane over the anvil roll rupture the membrane so that a slab is severed from the remainder of the strip.

A method forming one embodiment of the invention includes the steps of compressing a strip of material between a blunt instrument and a support to form a thin film, and exerting a pull upon the strip to rupture the thin film.

An apparatus forming one embodiment of the invention comprises a pair of opposed members, a blade secured to one of the members, means for moving the blade toward the member to which it is not secured to bring the blade into severing

2 position therewith, whereby a strip of plastic material to be severed is pinched therebetween, and means for moving the last-mentioned member transversely to the blade to sever the elastic strip.

A complete understanding of the invention may be obtained from the following detailed description of a method and an apparatus forming specific embodiments thereof, when read in conjunction with the appended drawings, in which Fig. 1 is a side view of an apparatus forming one embodiment of the invention, with portions thereof broken away;

Fig. 3 is an enlarged, fragmentary, vertical section taken along line 3—3 of Fig. 2;

Fig. 4 is an enlarged, fragmentary, horizontal section taken along line 4—4 of Fig. 2;

Fig. 5 is an enlarged, fragmentary, vertical view in partial section of a portion of the apparatus;

Fig. 6 is an enlarged, fragmentary, vertical section taken along line 6—6 of Fig. 2;

Fig. 7 is an enlarged, fragmentary, horizontal section taken along line 7—7 of Fig. 6;

Fig. 8 is an enlarged, fragmentary, vertical section taken along line 8—8 of Fig. 4, and Fig. 9 is an enlarged, fragmentary, vertical section taken along line 9—9 of Fig. 4.

Figure 2:
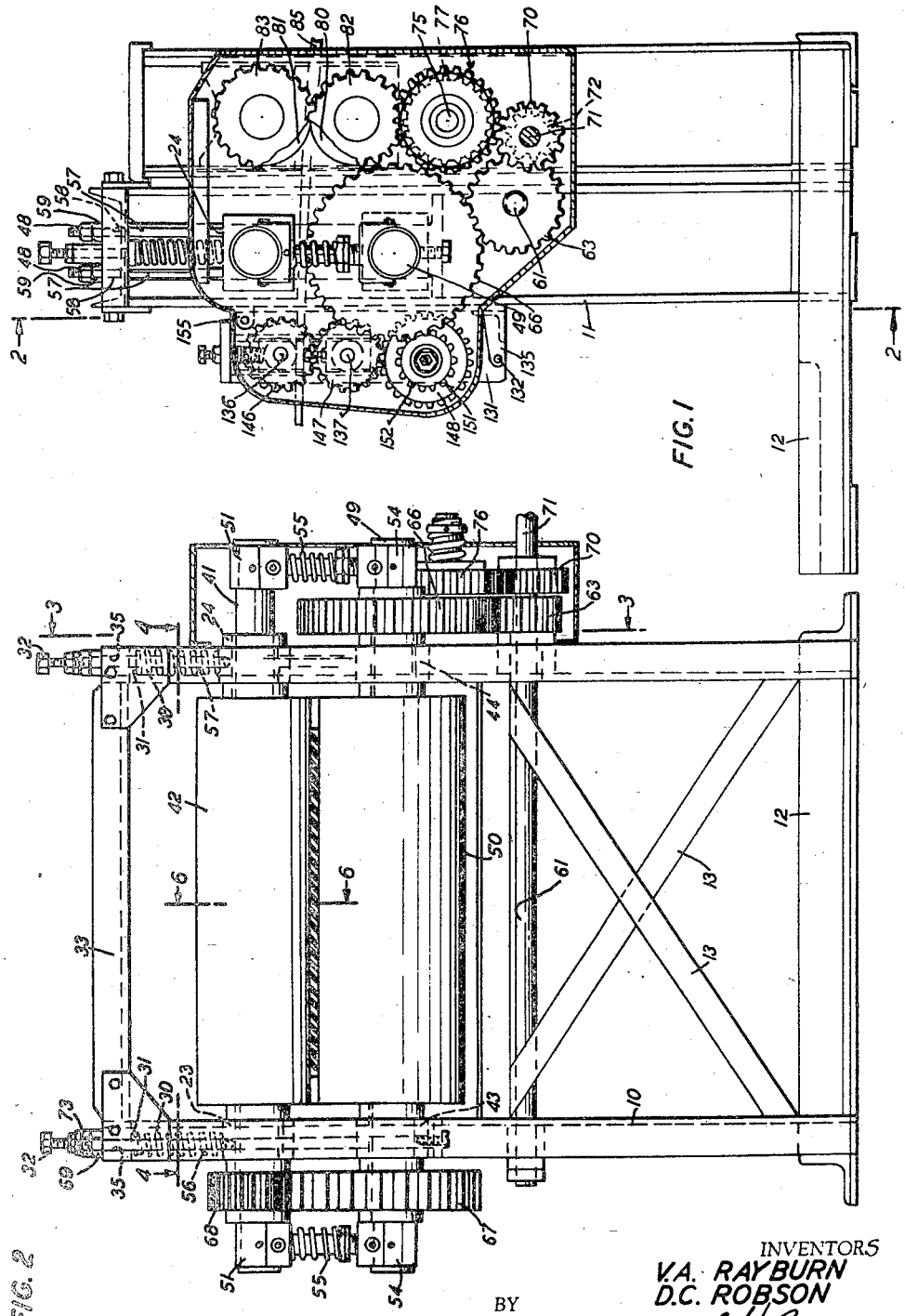
Fig. 2 is a section taken along line 2—2 of Fig. 1.

Referring more particularly to the drawings, a pair of vertical side members 10 and 11 (Fig. 2) are secured in upright positions to a base 12. A plurality of cross-braces 13—13 serve to secure the vertical side members 10 and 11 rigidly in the positions shown in Fig. 2. The side members 10 and 11 have guideways 19 and 20 (Fig. 5), respectively, formed therein, and a pair of slotted journal boxes 23 and 24 are slidably mounted in the guideways 19 and 20, respectively.

A pair of compression springs 30—30 are mounted between the journal boxes 23 and 24 and spring centering seats 31—31 (Fig. 2) engaging the ends of a pair of adjusting bolts 32—32, which are threaded through a pair of tapped bores 35—35 formed in a tie-cap 33, which is bolted to the side members 10 and 11. The bolts 32—32 may be threaded farther into or out of bores 35—35 to adjust the compressions of the springs 30—30. The journal boxes 23 and 24 serve to rotatably mount a shaft 41 on which a blade roll 42 is secured.

A pair of slotted journal boxes 43 and 44 (Fig. 5) are secured in the bottoms of guideways 19 and 20, respectively, by a pair of cap bolts 47—47 projecting through sleepers 45 and 46, and support a shaft 49 (Fig. 2) secured to an anvil roll 50. The journal boxes 23 and 24 are urged by the compression springs 30—30 toward the journal boxes 43 and 44, respectively, whereby the blade roll 42 is urged toward the anvil roll 50.

Journal boxes 51—51 are mounted on the extended extremities of the shaft 41 and are secured to guide rods illustrated by a guide rod 52, which guide rods telescope into guide tubes 53—53 pinned to journal boxes 54—54 mounted on the extended extremities of the shaft 49. Compression springs 55—55 abutting against adjustment nuts 37—37 urge the journal boxes 51—51 away from the journal boxes 54—54 so that the shaft 41 is urged upwardly against the top halves of the journal boxes 23 and 24 at all times and the shaft 49 is urged downwardly against the bottom halves of the journal boxes 43 and 44 at all times.

Stay rods 56—56 and 57—57 (Fig. 4) are secured to the journal boxes 23 and 24, respectively. The stay rods 57—57 are slidably mounted in bores 58—58 (Fig. 3) formed in the tie-cap 33. Nuts 59—59 threaded on the upper ends of the stay bolts 57—57 may be adjusted to raise or lower the positions of the stay bolts 57—57 and the journal box 24 relative to the side member 11. Lock nuts 48—48 secure the nuts 59—59 in their adjusted positions on the rods 57—57. The stay rods 56—56 (Fig. 4) are similarly mounted on the tie cap by nuts illustrated by nut 69 (Fig. 2) and lock nuts illustrated by a lock nut 73. The compression springs 30—30 urge the journal boxes 23 and 24 downwardly, as viewed in Fig. 2, which movement is limited by the stay rods 56—56 so that the blade roll 42 is ordinarily held a predetermined distance from the anvil roll 50. This distance is less than the thickness of a strip 85 made of a rubber or rubber-like compound to be severed so that the portion of the strip 85 between the blade roll and the anvil roll is squeezed somewhat.

An idler shaft 61 (Figs. 1 and 2) has an idler gear 63 rotatably mounted thereon, and the gear 63 meshes with a bull gear 66 keyed to the anvil roll shaft 49. A roll end gear 67 keyed to the anvil roll shaft 49 meshes with and serves to drive a roll end gear 68 keyed to the blade roll shaft 41. The gear 67 is somewhat larger than the gear 68 and, when the gears 67 and 68 are rotated, the rolls 42 and 50 are rotated in inrunning directions at different peripheral speeds, the peripheral speed of the roll 42 being greater than that of the roll 50.

The idler gear 63 meshes with a drive pinion 72, mounted upon a drive shaft 71, which is driven in a counterclockwise direction by suitable driving means (not shown). A drive pinion 70 secured to the drive shaft 71 drives a gear 77 (Figs. 1 and 9) through a suitable adjustable friction clutch 76, which is rotatably mounted on a bearing post 75. The gear 77 serves to drive feed rolls 80 and 81 through gears 82 and 83, respectively. The clutch 76 transmits torque up to a predetermined amount, which may be adjusted by varying the compression of a compression spring 78 (Fig. 9) of the clutch.

When the drive shaft 71 (Fig. 1) is driven, the feed rolls 80 and 81 are driven through the system of gearing just described at rates of speed at which the strip 85 is advanced therebetween toward the rolls 42 and 50 at a rate of speed less than that at which the last-mentioned rolls serve to advance the strip, so that the portion of the strip between the feed rolls and the blade and the anvil rolls is under tension. The difference between the strip-advancing rates of speed of the feed rolls and the shearer rolls is such that the blade and the anvil rolls tend to advance the strip at a rate about 20% faster than its normal rate of delivery by the feed rolls.

A pair of wedge-shaped blade rests 90—90 (Fig. 5) having cylindrical base portions 91—91 are mounted slidably in a slot 92 formed in the blade roll 42. An adjusting screw 95 having right and left hand threads 96 and 97 formed on the ends thereof is threaded into tapped bores 100 and 101, respectively, formed in the cylindrical base portions of the blade rests 90—90. A blade 102 having a blunt severing edge 105 formed thereon is secured in the slot 92 by a clamping bar 106 (Figs. 6 and 7) and side walls 107 of the slot 92. The clamping bar 106 (Fig. 6) and blade roll 42 are provided with relieved portions 108 and 109—109 (Fig. 3), respectively, adjacent to the sides of the blade so that only the blade and the anvil roll 50 contact the portion of the strip 85 between the blade roll and the anvil roll when the blade roll is in the position shown in Fig. 3. At this time the full force of the compression springs 30—30 act on the blade to pinch the strip to a membrane 98 (Fig. 6) between the blade and the anvil roll.

Inclined surfaces 110—110 (Fig. 5) formed on the back of the blade 102 are complementary to and bear against inclined surfaces 109—109 of the wedges 90—90. If it is desired to adjust the blade 102 relative to the blade roll 42, the clamping bar 106 is loosened from the roll 42 by loosening cap screws 118—118 and forcing jack screws 119—119 against a shoulder 123 to free the blade in the slot 92, and a wrench (not shown) is used to rotate a shaft 111, which has a hexagonal socket 112 in an insert 115 in which the shaft 111 is mounted. A spiral gear 116 secured to the shaft 111 meshes with a spiral gear 117 on the adjusting screw 95, whereby the adjusting screw 95 is rotated. When the shaft 111 is turned, the threads 96 and 97 are threaded farther into or out of the tapped bores 100 and 101 and the blade rests 90—90 are drawn closer together or forced farther apart depending upon the direction in which the shaft 111 is turned.

When the blade rests 90—90 are drawn closer together, the blade 102 is forced farther out of the slot 92 in the blade roll 42. When the blade rests are moved farther apart, the blade can be pressed farther into the slot 92. After the blade has been adjusted, the clamping bar 106 is tightened in the slot and the blade is secured therein in the adjusted position. The shaft 95 is provided with spacing collars 120—120, which fit into a cavity 121 formed centrally in the blade roll and a notch 122 formed centrally in the back of the blade, whereby the adjusting screw 95, the blade rests and the blade are held against lengthwise movement relative to the blade roll.

The blade roll is rotated through the system of the gearing described hereinabove at a predetermined rate of speed, at which rate of speed the linear speed of the severing edge 105 of the blade 102 is from about 35% to about 50% greater than that of the periphery of the anvil roll 50. The greater rate of speed of the severing edge serves to rub the membrane 98 of the strip 85 over the anvil roll when the blade engages the strip 85. The peripheral rate of speed of the blade roll is greater than that of the anvil roll. For this reason plus the fact that the blade roll is driven by the anvil roll through gears 67 and 68, there is no backlash caused between the gears 67 and 68 by the passage of the strip between the rolls.

Frame members 130 and 131 (Fig. 4) are secured to a pintle 132 (Fig. 1), which serves to mount the frame members pivotally to lugs illustrated by a lug 135 formed on the frame member 131. Shafts 136 and 137 (Fig. 8) are rotatably mounted on the frame members, and a plurality of spiral torsion springs 140—140 and 141—141 (Fig. 8) secured to the shafts 136 and 137, respectively, drive cylindrical shells 142 and 143, respectively, which shells are mounted rotatably upon these shafts to form tailer rolls 144 and 145. Screws 149—149 attach the springs 140—140 and 141—141 to the shells 142 and 143, respectively. The tailer rolls 144 and 145 are disclosed in detail and are claimed in copending application Serial No. 610,825, filed August 14, 1945, for Methods of and apparatus for shearing strips of plastic material.

A roll end gear 146 (Fig. 1) fastened to the shaft 136 meshes with a roll end gear 147 fastened to the shaft 137, and the gear 147 meshes with a floating gear 148 of an adjustable friction clutch 151 mounted on bearing post 150 (Fig. 3). The clutch 151 is driven by a gear 152, which meshes with the bull gear 66 when the frame members 130 and 131 are latched by a latch 155 in upright positions illustrated by the position of the frame member 131 in Fig. 1. The frame members 130 and 131 may be pivoted about the axis of the pintle 132 in a counterclockwise direction as viewed in Fig. 1, after unlatching the latch 155, to provide access to the shearer rolls 42 and 50.

The tailer rolls 144 and 145, when not in contact with the strip 85, are driven in opposite in-running directions through the gear 66, the gear 152, the clutch 151 and the gears 147 and 146 at the same peripheral rate of speed, which rate of speed is about twice that at which the strip 85 is advanced by the rolls 42 and 50. This causes the tailer rolls to be slowed when in contact with the strip 85, whereby the spiral springs 140—140 and 141—141 (Fig. 4) are wound up so as to build up tension in the portion of the strip between the blade and anvil rolls and the tailer rolls.

The clutch 151 is adjusted to transmit only a predetermined torque to the gear 148, which torque is such that the clutch 151 slips when the torsion springs 140—140 and 141—141 are completely wound up but does not slip when the torsion springs are not completely wound up. If desired, some of the springs 140—140 and some of the springs 141—141 may be unfastened from the shells 142 and 143, respectively, and the clutch 151 adjusted to transmit a torque lower than that transmitted when all of the springs are connected to the shells. When so adjusted, the tension built up in the strip 85 by the tailer rolls is lower than that built up by the tailer rolls when all of the torsion springs are fastened to the shells 142 and 143.

The feed rolls 80 and 81 are spaced as close as possible to the blade roll 42 and the anvil roll 50 so that a relatively high tension is built up in the portion of the strip 85 extending therebetween by the time the membrane 98 is formed by the blade 102 and the anvil roll. Also, the tailer rolls 144 and 145 are spaced as close as possible to the blade roll and the anvil roll so that the spiral torsion springs 140—140 and 141—141 (Figs. 4 and 9) are completely wound up when the membrane is formed and the tailer rolls exert a high tension upon the membrane.

In practicing the invention, the strip 85 (Fig. 1) is advanced by the feed rolls 80 and 81 to the blade and anvil rolls 42 and 50, which advance the strip to the tailer rolls 144 and 145. The blade roll and the anvil roll are driven faster than the feed rolls, whereby tension is imparted to the portion of the strip therebetween. The tailer rolls are driven faster than the blade and the anvil rolls and wind up so that tension is also imparted to the portion of the strip between these two sets of rolls.

The strip 85 is contacted by the periphery of the blade roll 42 until the blade 102 engages the strip as shown in Fig. 6. At this time, the tension upon the portion of the strip between the blade and the feed rolls 80 and 81 is relatively high, and the tailer rolls 144 and 145 are completely wound up and the tension upon the portion of the strip between the blade and the tailer rolls is relatively high. The blunt severing edge 105 pinches the strip into the membrane 98 and the tension upon the portions of the strip 85 on both sides of the severing edge together with the pressure of the blade and the anvil roll 50 on the membrane and the rubbing of the membrane on the anvil roll cause the membrane to rupture. The tailer rolls 142 and 143 then shoot the slab severed from the strip 85 therethrough and the rolls 42 and 50 feed the new end of the strip 85 to the tailer rolls, after which the operation described hereinabove is repeated.

During the severing operation, the blade 102 forms the membrane 98 and rubs it over the anvil roll 50 so that the friction between the anvil roll and the membrane aids in rupturing the membrane. The relieved portions 108 and 109 of the clamping bar 106 and the blade roll 43, respectively, provide clearance for the strip 85 when the strip is engaged by the blade 102 so that all of the pressure exerted upon the strip 85 by the blade and the blade roll is exerted by the blunt severing edge 105.

In the method and the apparatus described hereinabove, the strip 85 is severed into slabs of equal lengths by the pinching action of the blade 102 and the anvil roll 50, the tension placed upon the strip by the feed rolls 80 and 81 and the tailer rolls 142 and 143 and the rubbing of the membrane 98 by the blade. Thus, the severing edge 105 may be blunt so that it may be kept in excellent pinching condition with little or no maintenance thereof.

The feed rolls 80 and 81, the blade roll 42, the anvil roll 50 and the tailer rolls 144 and 145 all are conveying rolls and advance the strip 85 therebetween continuously so that the strip is rapidly sheared into slabs.

The apparatus and methods embodying this invention are especially useful for severing strips of plastic materials, such as compounds made of rubber or synthetic rubber-like materials. Thus, strips of insulating and jacketing compounds, such as are used to form coverings on electrical conductors and cables, may be readily cut into slabs that are suitable for further processing in accordance with known methods. Such compounds may include natural rubber, or "neoprene" (polymerized chloroprene), Buna or other synthetic rubber-like material, or mixtures thereof.

What is claimed is:

1. In a shearing apparatus, a pair of opposed members, a blade secured to one of said members, means for moving the blade toward the other of said members to compress a portion of a strip of material between the blade and the last-mentioned member, and means for effecting transverse relative movement between the last-mentioned member and the blade to sever the strip at the compressed portion thereof.

2. In a shearing apparatus, a member for supporting a strip of material to be severed, a blade having a severing edge formed thereon, means for moving the blade toward said member to compress a portion of the strip of material supported by said member between the severing edge and said member, and means for actuating said blade to move relative to said member the portion of the strip compressed between said bar and said member to sever the strip.

3. In a shearing apparatus, a member for supporting a strip of material to be severed, a blade having a severing edge formed thereon, means for moving the blade periodically toward said member to compress a portion of the strip of material supported by the member, means for moving the blade along the member when the strip is compressed, and means for placing the strip under tension when the blade is moved toward said member, whereby the strip is ruptured.

4. In a shearing apparatus, an anvil for supporting an article to be severed, a severing blade, means for moving said blade into engagement with an article supported on said anvil, and means for moving the blade along said anvil to sever the article.

5. In a shearing apparatus, a pair of inrunning feed rolls for advancing a strip of material therebetween at a predetermined rate of speed, a pair of shear rolls for advancing the strip of material from the feed rolls at a higher rate of speed, whereby tension is built up in the portion of the strip between said pairs of rolls, and a blade extending along one of the shear rolls for compressing the strip to a thin film, whereby the tension of the strip snaps the thin film thereof.

6. In a shearing apparatus, a pair of juxtaposed feed rolls, means for rotating the feed rolls so as to advance a strip of elastic material therebetween at a predetermined rate of speed, a pair of juxtaposed shear rolls positioned on the recess side of the feed rolls, means for rotating the shear rolls to advance the strip at a rate of speed greater than said predetermined rate, whereby the portion of the strip between the feed rolls and the shear rolls is tensioned, and a blade projecting from one of the shear rolls for compressing the strip to a membrane between the blade and the other shear roll so that the membrane is ruptured.

7. In a shearing apparatus, a blade roll, an anvil roll, a blade projecting from the blade roll for compressing to a membrane between it and the anvil roll a portion of a strip of elastic material, means for rotating the rolls in opposite inrunning directions to advance the strip of elastic material therebetween, and means spaced from the rolls for tensioning the portion of the strip between it and the rolls, whereby the strip is ruptured when the blade and the anvil roll form the membrane.

8. In a shearing apparatus, a blade roll, an anvil roll positioned in an opposed relationship with respect to the blade roll, a blade projecting from the periphery of the blade roll, means for rotating the anvil roll in one direction at a predetermined peripheral rate of speed, means for rotating the blade roll in the opposite direction at a rate of speed at which the rate of speed of the blade is different from the peripheral rate of speed of the anvil roll, whereby a strip of material is rubbed over the anvil roll when compressed between the blade and the anvil roll, and means for tensioning the strip of material.

9. In a shearing apparatus, a blade roll, an anvil roll juxtaposed with respect to the blade roll, means for driving the blade roll and the anvil roll in opposite, inrunning directions to advance a strip of material therebetween, and a blade secured to the blade roll for pinching the strip between it and the anvil roll.

10. In a shearing apparatus, a cylindrical roll having a slot formed therein, a blade having a pair of inclined surfaces formed thereon, means for securing the blade in the slots, a pair of wedge-shaped blade rests slidably mounted in the slot for engaging the inclined surfaces on the blade, and means for adjusting the blade rests relative to the slot to adjust the blade relative to the slot.

11. In a shearing apparatus, a blade roll, an anvil roll, means for pressing the rolls together, a blade having a blunt severing edge, means for securing the blade to the blade roll in a position in which the severing edge thereof is parallel with the axis of the blade roll and is spaced a predetermined distance outwardly from the periphery thereof, means for rotating the anvil roll in one direction at a predetermined peripheral rate of speed, means for rotating the blade roll in the opposite direction at a rate of speed at which the severing edge of the blade is moved at a rate of speed greater than the peripheral rate of speed of the anvil roll so that the blade engages and rubs a strip of elastic material over the anvil roll as the blade is advanced into juxtaposition with respect to the anvil roll, a pair of feed rolls for advancing a strip of elastic material to the blade roll and the anvil roll, means for rotating the feed rolls in opposite directions at a peripheral rate of speed less than that of the anvil roll, whereby the strip of elastic material advanced by the blade and the anvil rolls and the feed rolls is tensioned therebetween.

12. The method of shearing strips of elastic material which comprises compressing a portion of a strip of material between a blunt instrument and a support to form a thin film thereof, and simultaneously therewith exerting a pull upon the strip to rupture the thin film.

13. The method of shearing strips of elastic material, which comprises compressing a strip of elastic material between a pair of severing elements, moving the severing elements at a predetermined rate of speed, and retarding the strip with respect to the severing element to tension it, whereby the strip is ruptured.

14. The method of shearing strips of elastic material, which comprises compressing to a thin film a portion of a strip of elastic material, simultaneously therewith applying an advancing force to the strip, and simultaneously therewith retarding the advancement of the strip to rupture the thin film.

15. The method of shearing strips of elastic material, which comprises pinching a portion of a strip of material between a blunt instrument and a support to form a thin film thereof, exerting a pull upon the strip, and rubbing the thin film over the support.

16. The method of shearing strips of elastic material, which comprises compressing a strip of elastic material between a pair of severing elements, moving the severing elements in the same direction at different predetermined rates of speed, and retarding the strip to tension it, whereby the strip is ruptured.

17. The method of shearing strips of elastic material, which comprises compressing to a thin film a portion of a strip of elastic material, applying an advancing force to the thin film of the strip, retarding the advancement of the strip, and rubbing the thin film to rupture it.

VINCENT A. RAYBURN.
DUER C. ROBSON.

REFERENCES CITED

The following references are of record in the file of this patent:

UNITED STATES PATENTS

| Number | Name | Date |
|---|---|---|
| 1,958,137 | Fowler | May 8, 1934 |